INVENTORS
ROSCOE R. LOBOSCO
STANLEY H. ROYER
ALFRED J. MILLER
BY Barnwell R. King
ATTORNEY June 5, 1962 R. R. LOBOSCO ET AL 3,037,888
METHOD OF CUTTING
Filed Oct. 3, 1958 6 Sheets-Sheet 2

INVENTORS
ROSCOE R. LOBOSCO
STANLEY H. ROYER
ALFRED J. MILLER
BY Barnwell R. King
ATTORNEY

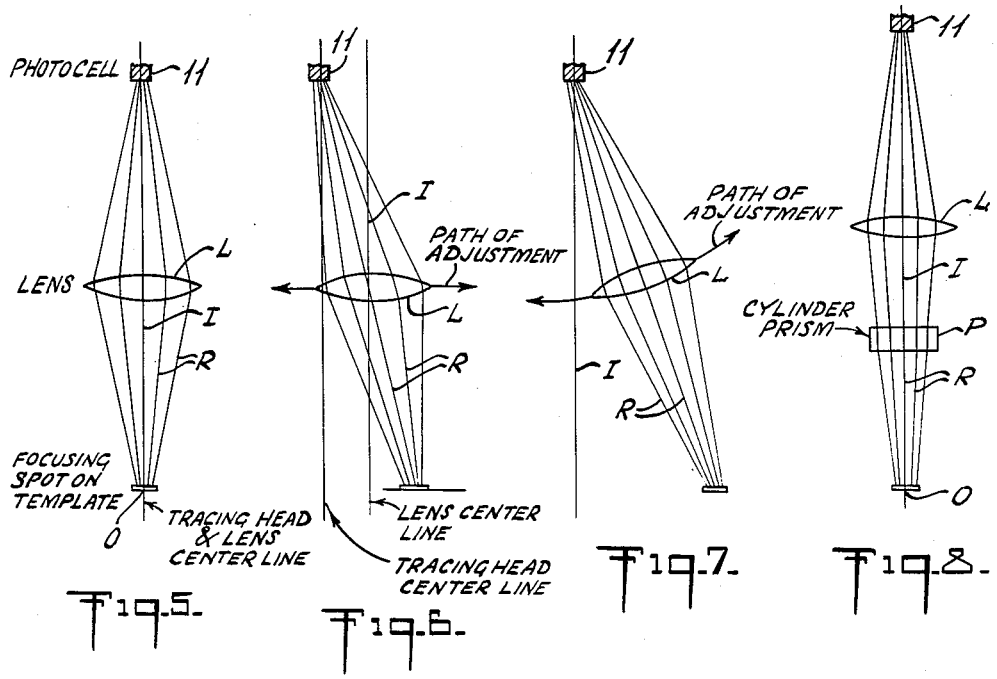
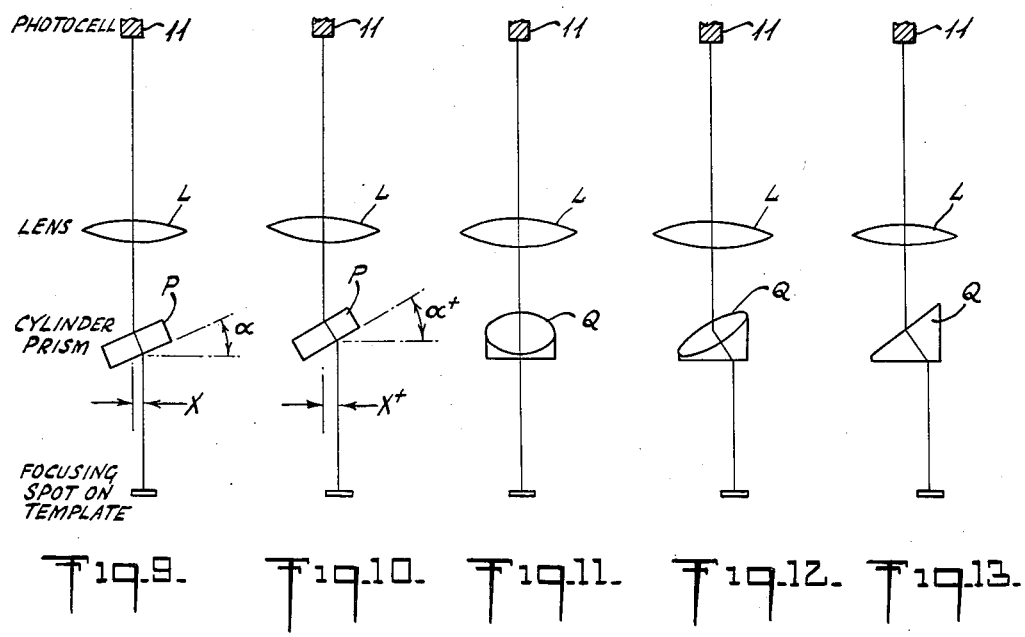

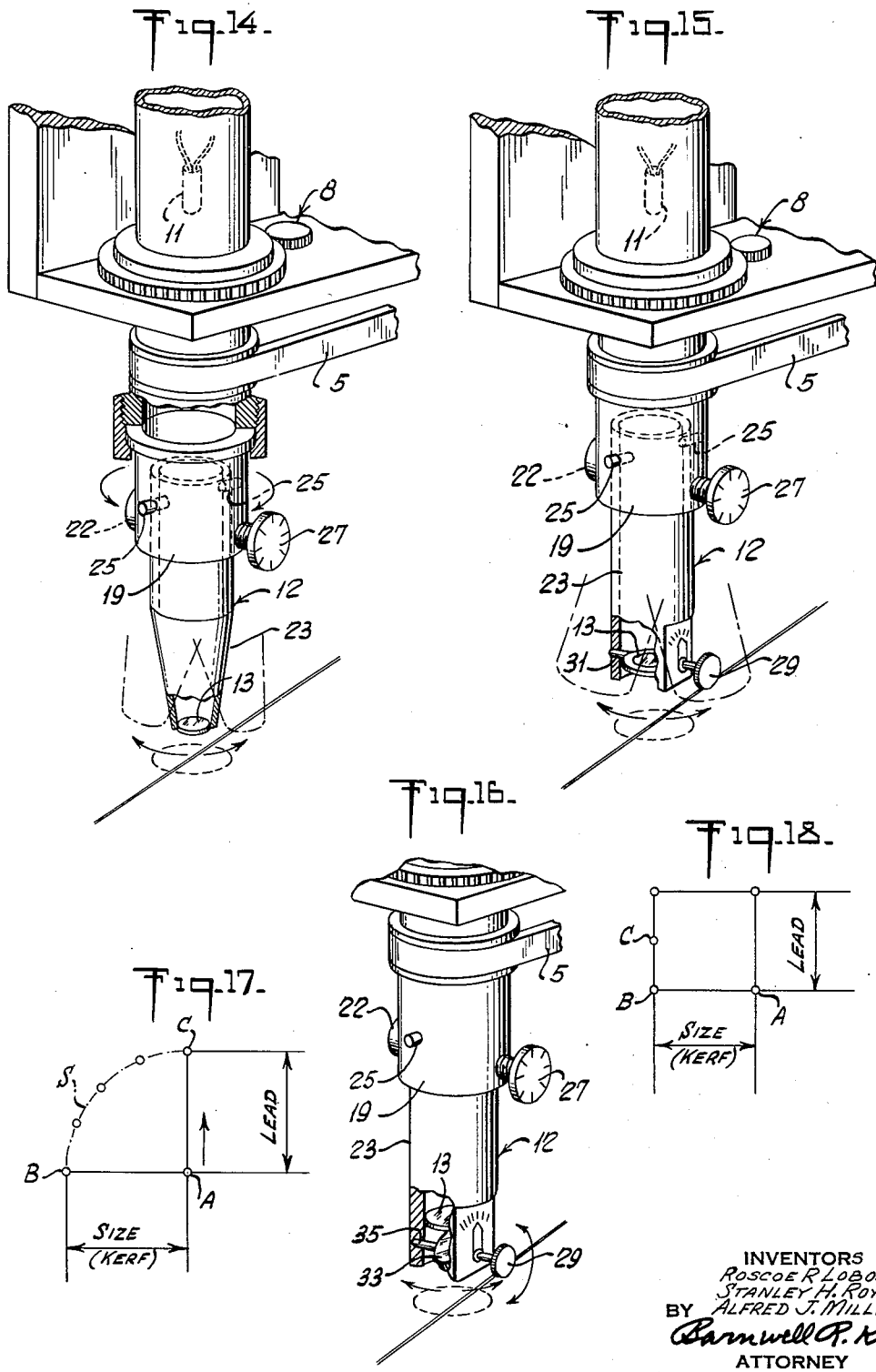

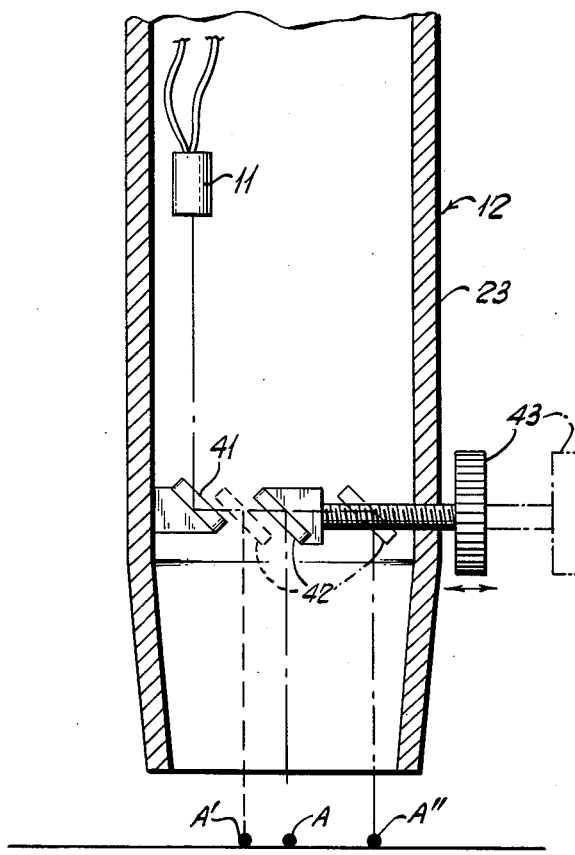

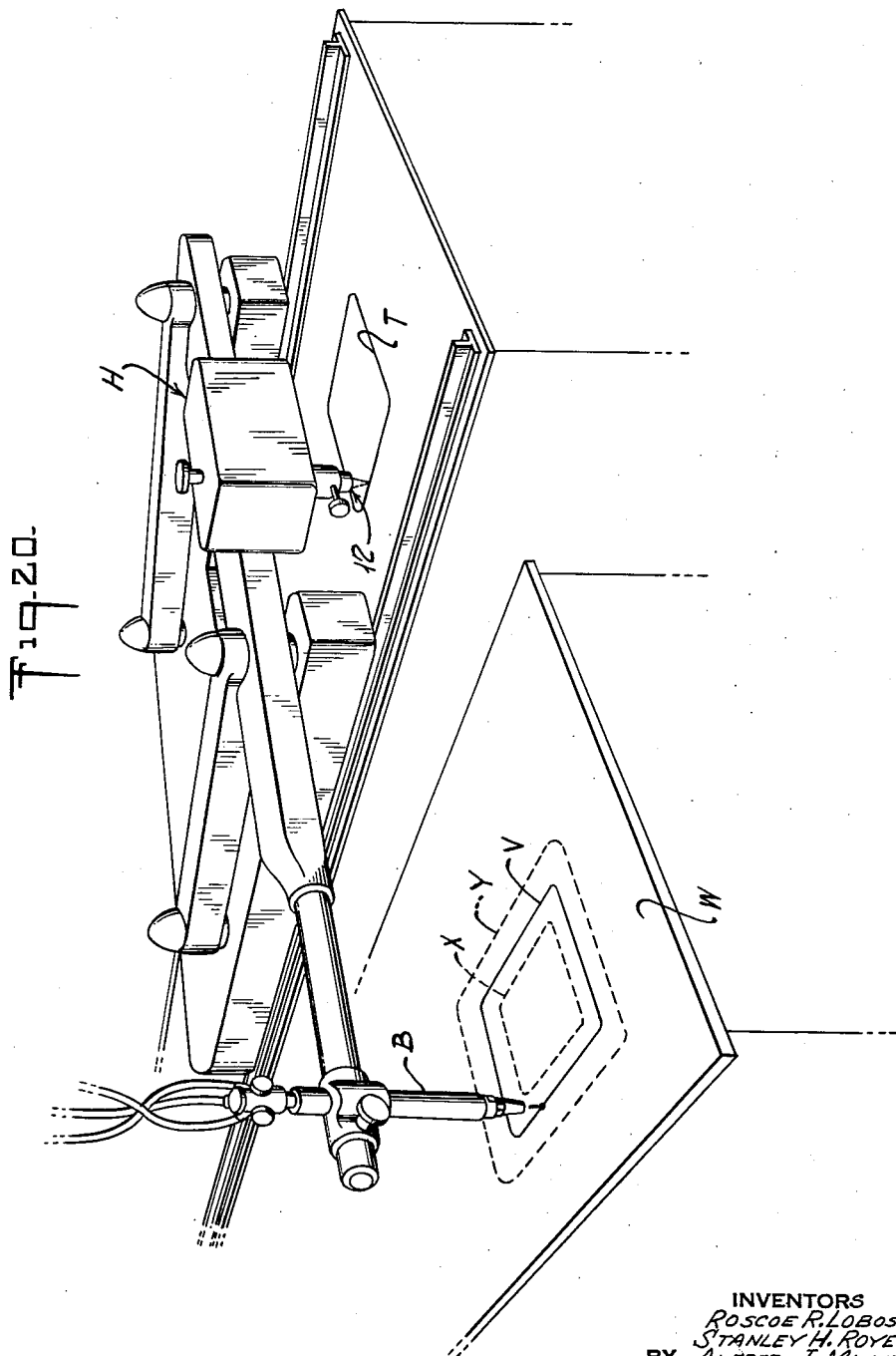

3,037,888
METHOD OF CUTTING
Roscoe R. Lobosco, Fanwood, Stanley H. Royer, Elizabeth, and Alfred John Miller, Westfield, N.J., assignors to Union Carbide Corporation, a corporation of New York
Filed Oct. 3, 1958, Ser. No. 765,085
3 Claims. (Cl. 148—9)

This invention relates to photocell tracer for automatic control of cutting and shaping machines and, more particularly, to an improved method of and means for adjustably changing the direction of light carrying an image of an object such as a line being traced to a photocell.

The present invention provides a method of tracing with an electric photocell tracer and, in brief, comprises a light-sensitive tracing element and an image-producing optical system operative ly associated therewith, such that the direction of the light passing from the object being traced to the photocell is bent or refracted so as to form an image displaced from the normal position of the object being traced.

One of the problems encountered in thermochemical shape cutting is that the cut shape will always be larger or smaller than the shape of the object being traced. That is to say, the object size and the cut size are never in a 1:1 ratio. This is due to the kerf width produced by the cutting gas stream. Heretofore, this disadvantage was compensated for by dimensional allowance in the templet, such as making it oversize. Although this is a possible solution, it requires a different templet size for each cutting nozzle size employed. Different nozzle sizes must be employed when cutting different plate thicknesses. A prior method of size or kerf-adjustment comprises adjusting a mechanical linkage attached to the tracing head, causing the photocell to move transversely to the line being traced which results in a greater or lesser offset of the center of the photocell to the center line of the steering motor.

An important object of the invention is to cut various sizes of shapes from a single templet by simply adjusting the optical system such that the photocell traces a path which is larger or smaller than the actual templet.

The novel features of the present invention incorporate a light sensitive tracing element in combination with an image producing optical system operatively associated with said element to change the effective position of such image with respect to said element. In the optical system the light is so directed as to displace the image of the object being traced from the normal position thereof as described more completely hereinafter.

By way of further explanation, photocell tracers require a lead (eccentricity) between the area scanned and the center of steering rotation to stabilize the operation of the apparatus and reduce its tendency to hunt or oscillate.

Another object of the invention is to provide novel means to control the amount of such lead by adjusting the optical system with respect to the photocell.

In summary, the invention provides a light-sensitive tracing means associated with an optical system which is easily adjustable relative to the photocell. An important distinguishing feature is that size or kerf adjustment is not obtained by increasing or decreasing the offset between the photocell axis and the steering motor axis, as done in the prior art, but rather the relationship between photocell axis and steering motor axis is kept constant, while the line being traced is offset from the axis of the photocell by bending the path of reflected light rays as they pass from the templet or other line to the photocell.

FIGS. 3, 4, 14, 15, 16, and 19 are similar views of modifications of the invention;

FIGS. 5–13 are diagrams of the light ray patterns for various positions of the lens and prisms of various optical systems of the invention;

FIGS. 17, 18 are diagrams showing relative position of the point traced before and after adjustments; and FIG. 20 is a fragmentary perspective view of a shape cutting machine embodying the invention.

Figure 1:
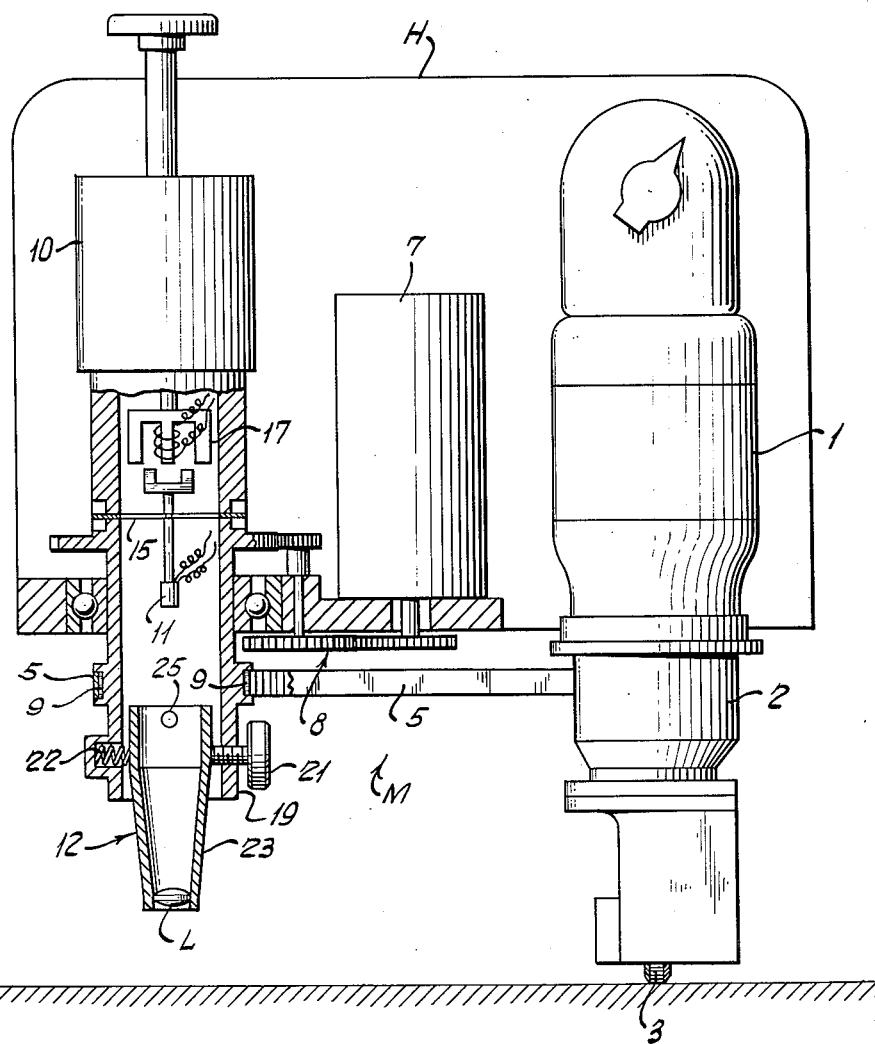
FIG. 1 is a view, partly in side elevation and partly in section of a tracer illustrating the invention.

Tracing machine M, FIG. 1, is provided with a tracer head H, comprising a drive motor 1, gear reduction unit 2, and drive wheel 3. A timing belt 5 synchronizes the rotation of the gear reduction unit 2 and drive wheel 3 with the rotation of a steering motor 7 through a gear train 8. Toothed sprockets 9 engage teeth on belt 5 to ensure precise synchronization of an object following unit 10 therewith. The mechanical arrangement thus far is similar to that disclosed in the W. L. Martin Patent No. 2,678,496 and is described more fully therein. However, the Martin unit does not utilize an object following unit that is light-sensitive.

In the present case the object following or line tracing unit 10 comprises a small calcium sulfide photocell 11 used in combination with a unique optical system 12. The photocell 11 is mounted on leaf springs 15 magnetically coupled to a small A.C. electromagnet 17 which causes the photocell 11 to vibrate at a predetermined frequency in a direction normal to a line of a drawing being traced. When the line of the drawing is displaced relative to the center of vibration of the scanning photocell 11, two different amounts of light are focused upon it. This results in a signal containing the frequency (60 cycles, for example) whose phase (relative to phase of the such frequency) depends upon which side of the center of vibration the line on the drawing is displaced. This error signal at such frequency is applied and used to drive the steering motor 7 in a direction so as to reduce the error between the line on the drawing and the center of vibration of the scanning photocell.

The above description is but an example of a line tracer with which the invention may be employed. However, it is to be understood that any photocell tracer may be employed with the invention. As an alternative, the photocell may be maintained in a fixed position and an element of the optical system such as a mirror, lens or the like, made to vibrate.

Figure 2:
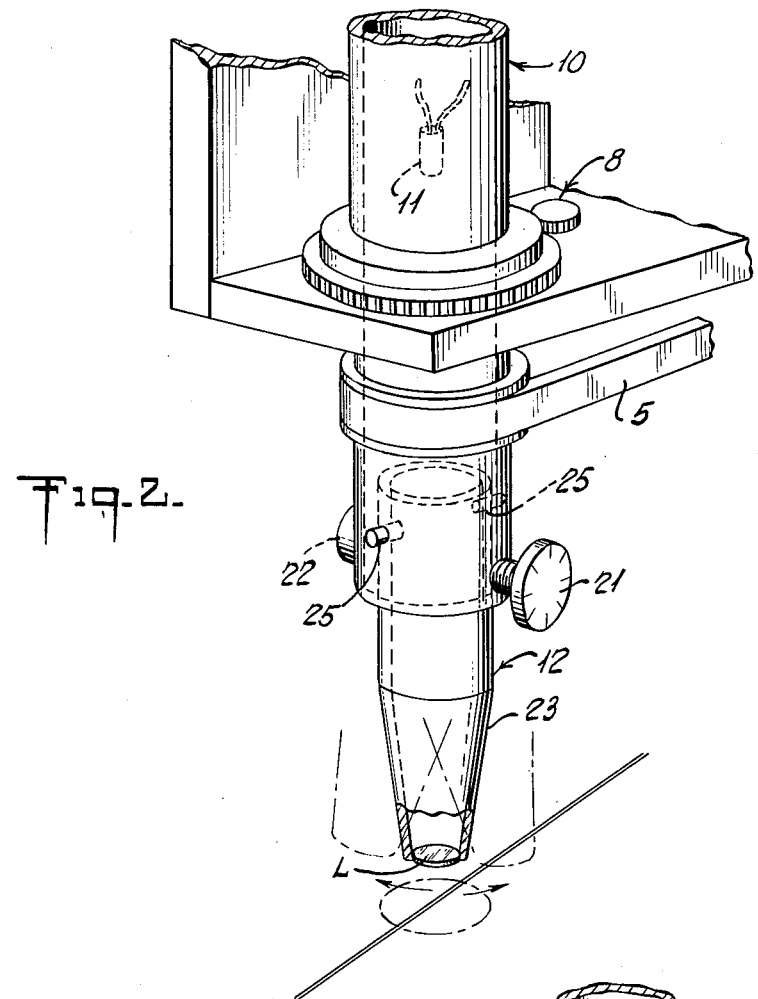
FIG. 2 is an enlarged fragmentary perspective view of the optical system parts being broken away and shown in section.

Referring to FIG. 2, in order to obtain kerf adjustment according to the present invention, the optical system 12 comprises a tube 23 pivoted on pins 25 joining tube 23 to a depending hollow shaft 19, that carries the tracing unit 10 thereon. A lens L is mounted in the tube 23. As a result, the image of the line being traced is offset by the lens L so that the line seen by the photocell 11 is either to the right or left of its normal position. By calibrating the swing of the tube 23 with a manually adjustable dial 21 and spring 22, the amount of offset is conveniently related to the width of kerf or size adjustment desired.

FIGS. 5, 6, and 7 are schematic drawings illustrating what occurs when the tube 23 is adjusted relative to the photocell 11. FIG. 5 illustrates the relative position of lens-to-photocell when there is no size or kerf adjustment. In FIG. 6 the lens L has been moved horizontally, its short axis or centerline I remaining perpendicular to the line or templet O. Light rays R reflected from the templet line O will bend as they pass through the lens L to the photocell. Because of this lens phenomenon, the axis of the photocell must be displaced from the line being traced in order to have the line image fall on the photocell. By so adjusting the position of the lens, the amount of displacement can be varied so that the photocell traces an image of the line which is either to the right or left of the object being traced. The difference in relative size between the displaced path and the object is the amount of effective kerf adjustment obtained by setting dial 21, FIG. 1.

In FIGS. 2 and 7 the lens L is pivoted so that it may swing to the left or right, relative to the photocell. As a result, the lens can be moved horizontally and also in an arc. Again, because of the lens phenomenon, the rays of light reflected from the line being traced are focused on the photocell. The result is that the photocell now, instead of seeing the line directly beneath it, sees a line which is either to the left or right of its (the photocell) axis. Since the photocell is linked to the steering motor which, in turn, is linked to the cutting implement, displacing the line seen by the photocell displaces the cutting implement which allows for the desired size or kerf adjustment. An example of linkage between photocell steering motor and a cutting blowpipe is fully described in Martin Patent No. 2,678,496.

FIGS. 3, 8, 9, and 10 illustrate the refractive phenomenon that occurs when light passes through a piece P of plate glass having parallel surfaces. By increasing the angle α of the plate glass, the offset X created between entering light rays and emerging light ray is increased.

Figure 3:
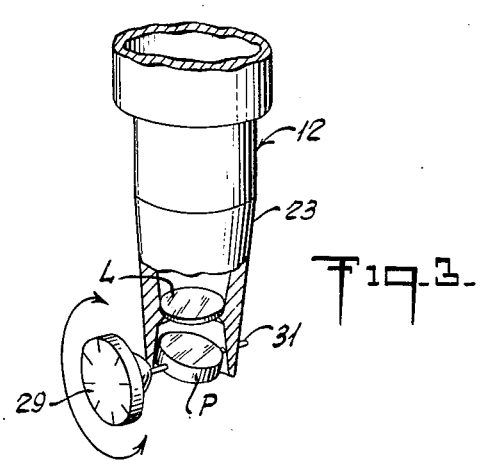

In FIG. 3 a transverse shaft 31 journaled in tube 23 carries prism P below lens L. By manually rotating dial 29 the light reflected from the line or templet edge being traced is bent. As a result, an imaginary line strikes the photocell. Controlling the amount of offset, by the degree of rotation of the prism, allows for proper size or kerf adjustment.

FIGS. 4, 11, 12, and 13 show somewhat the same phenomenon with a cylindrical prism Q mounted in a collar rotatably carried at the base of tube 23. Its rotation varies the effective offset of the photocell with respect to the object being traced such as a templet or line.

FIG. 19 illustrates modified means for obtaining optical adjustments by use of light reflecting surfaces; for example, mirrors. In such case a member having a light reflecting surface 41 is suitably secured within the tube 23. Axially in line with said reflecting surface 41 and offset from the axis of the tube 23 is photocell 11. Another member having a second reflecting surface 42 is threadably fastened to tube 23 by a bracket and finger screw arrangement 43 such that said second reflecting surface 42 may be moved in a linear path parallel to the path of travel of the tracer. Point A illustrates the relative position of the reflecting surfaces 41 and 42 when there is no size adjustment. Adjustments are made by rotating the bracket and screw arrangement 43 in or out, thereby changing the effective relative position of reflecting surface 42 to the point A' or A" being traced. Reflecting surface 41 will always remain relatively fixed in the position illustrated in FIG. 19.

For dependable control when cutting at high speeds (when tracing radii), the lead distance must be larger than the lead needed when cutting at slower speeds. When traveling at the slower speeds, the photocell signal has more time to operate the steering motor to correct errors; therefore, under such conditions, the lead distance may be smaller. The reverse is true with high cutting speeds. The following are typical examples of maximum speeds obtainable with a fixed lead distance on shapes having various radii. These speeds conceivably could be greatly increased if lead could be varied to suit the particular maneuver.

(a) 95 in. per min. for shapes having no radius shorter than 1⅜ in.

(b) 30 in. per min. for shapes having no radius shorter than ⅛ in.

(c) 10 in. per min. for shapes having no radius shorter than 1/16 in.

When the lead distance is anything greater than zero, the tracing apparatus will take short cuts across the radii of the shape. Short-cutting is an undesirable effect which is inherent in lead. It can be seen, then, that lead is necessary for steering control, but has undesirable effects on tracing fidelity or accuracy when traversing radii. As a result, a compromise must be reached.

Figure 4:
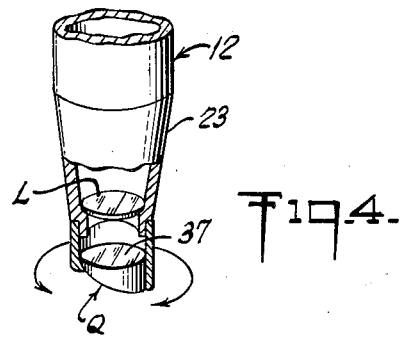

FIG. 17 illustrates diagrammatically what occurs when prism Q is rotated in tube 23, FIG. 4. When there is no adjustment, the point being traced will be at A. Because of the physical characteristics of prism 37, there will be one point B where all the adjustment will be in a plane perpendicular to the path of travel (notice the arrow) and there will be another point C where all the adjustment will be in a plane parallel to the path of travel. As the prism is rotated between these two extremities, the point B will appear to travel in the arcuate path S described by the small circles. As can be seen from FIG. 17, any adjustments between the extremities B and C will be a combination of size adjustments and lead adjustments. That is to say, any adjustment in size will also affect the lead and vice versa.

In FIG. 14 the lens 13 is mounted in tube 23, which is pivotably mounted at 25 to depending shaft 19. The depending shaft 19 is rotatably secured to the shaft 17. To obtain adjustments in a plane perpendicular to the path of travel, knob 27 is turned to screw in or out. When there is no adjustment, the point being traced will appear as point A, FIG. 17. By turning knob 27, the point A, for example, will appear to be at point B. Maintaining this adjustment and rotating shaft 19, combinations of lead and size adjustments may be made along the path S described by the small circles in FIG. 17 until the point C is reached. At this point all the adjustments will be lead adjustments. As the shaft 19 is further rotated, the arcuate path will continue to scribe a circle in the other three quadrants (not illustrated).

Referring to FIG. 15, lens 13 is rotatably mounted at the end of tube 23, which in turn is pivotably secured at points 25 to shaft 19. In this embodiment, lead and size adjustments can be made independently of each other. For example, referring to FIGS. 15 and 18, if kerf size adjustment is desired, knob 27 is turned to screw in or out so that the point being traced, which was originally at point A, will now appear to be at point B. If, in addition, lead adjustment is desired, knob 29 is rotated causing lens 13 to be tilted on the axis 31 such that point B will now, because of lens phenomena, appear at point C. Any combination of adjustments of size and lead can be obtained by this procedure, ranging from zero size adjustment and maximum lead to maximum size adjustment and zero lead.

In FIG. 16 the lens 13 is fixedly secured to tube 23, which in turn is pivotably mounted to shaft 19 at points 25. A prism 33 is rotatably secured at the lower end of tube 23 by shaft 35. To obtain size adjustment, knob 27 is rotated to screw in or out causing the tube 23 and lens 13 to swing in a plane perpendicular to the path of travel. If, in addition, or if lead adjustment only, is desired, knob 29 is rotated causing prism 33 to rotate on shaft 35, causing adjustments to be made along the path of travel which, because of the physical principles involved, will result in lead adjustment.

FIG. 20 illustrates a typical cutting machine comprising the invention. In this case, tracing head H is tracing an object such as the outline T of a shape. Mechanically linked to said tracing head H is a blow pipe B. When no adjustment of tube 12 is made, the blowpipe B will cut in the workpiece W a shape V the size of which is similar to shape T. When size adjustment is made according to the invention, the size of the object cut by the blowpipe will, depending on the type of adjustment made, either be smaller, as shown at X, than shape T, or larger, as shown at Y, than shape T.

Also, the lead distance may be varied readily from zero to any desired value which is suitable for the particular combination of speed and radii desired. This is accomplished by moving the point of scanning parallel to the line being traced, as pointed out above, such as by tilting the lens assembly. In this manner, the image of the area scanned is moved relative to the center of steering rotation, thus changing the lead to the desired value.

It is also conceivable to provide means such that the optical system may be adjusted with the rate of cutting so that the lead is automatically varied as the cutting speed is varied. It is also possible to provide means so that the lead or the cutting speed, or a combination of both, will be varied automatically by a signal, such as a code spot on the templet energizing a second photocell, as the scanner approaches a sharp radius.

We claim:

1. Method of shaping a body in accordance with the outline of a pattern, which comprises forming by light reflected from said pattern through an optical system in a tracing device upon a photocell therein an image of a segment of a pattern outlined to be traced, moving said tracing device and a tool connected thereto in response to a deviation of said image from a preselected target area on said photocell to form a kerf to outline said body, displacing the optical axis of said reflected light through said optical system relative to said photocell and said segment pattern outline by displacing an element of said optical system of said tracing device laterally with respect to said segment of said pattern outline, and transmitting said displacement to said photocell to cause the tool to follow a path correspondingly displaced from the outline being traced for a distance sufficient to keep the tool and resulting kerf to one side of the desired outline.

2. Method as claimed in claim 1, in which the photocell is above the pattern, and the optical system is adjusted by causing a change in the direction of the light reflected from said pattern to said photocell.

3. Method as claimed in claim 1, in which the optical system is also displaced longitudinally with respect to said segment of said pattern outline, and said longitudinal displacement is also transmitted to said photocell, to control the lead of the photocell movement around curves and corners of the pattern outline being traced.

References Cited in the file of this patent

UNITED STATES PATENTS

| | | | |
|---|---|---|---|
| 1,133,103 | Coleman | Mar. 23, | 1915 |
| 2,203,389 | Kurtz | June 4, | 1940 |
| 2,226,677 | Vikhman | Dec. 31, | 1940 |
| 2,331,337 | Meyer | Oct. 12, | 1943 |
| 2,352,179 | Bolsey | June 27, | 1944 |
| 2,419,641 | Hart | Apr. 29, | 1947 |
| 2,489,305 | McLennan | Nov. 29, | 1949 |
| 2,499,178 | Berry et al. | Feb. 28, | 1950 |
| 2,678,496 | Martin | May 18, | 1954 |
| 2,785,600 | Back | Mar. 19, | 1957 |
| 2,838,683 | Munro | June 10, | 1958 |
| 2,851,643 | Limberger | Sept. 9, | 1958 |
| 2,868,993 | Henry | Jan. 13, | 1959 |
| 2,933,612 | Cheverton et al. | Apr. 19, | 1960 |